Patented Nov. 3, 1953

2,658,035

UNITED STATES PATENT OFFICE 2,658,035

TREATMENT OF DRILLING MUDS WITH BARIUM STARCH

Harold E. Bode, Chicago, Ill., assignor to National Lead Company, New York, N. Y., a corporation of New Jersey No Drawing. Application November 16, 1949, Serial No. 127,759

6 Claims. (Cl. 252—8.5)

This invention relates to the treatment of well drilling fluids and to the treatment of certain earth formations encountered in the drilling of deep wells, such as oil or gas wells.

More particularly, the invention relates to the use in the oil well drilling art of a normally water inert, but activatable colloid capable of being activated by certain inherent or added drilling mud anions to simultaneously produce in-situ a cold water swellable carbohydrate and minutely dispersed metal salt precipitates. Both the viscous medium produced by the in-situ-created cold water carbohydrate paste and the finely precipitated, highly insoluble metal salts which are simultaneously obtained, are adapted to beneficially modify drilling mud qualities and to mitigate the sealing or compacting of drilled oil well earth formations.

In the oil well drilling fluid art, much effort is expended in properly modifying such factors as viscosity, gelling power, suspending power, clay-flocculating ion effects, mud filter cake permeability or water loss, clay bonding power, porous earth formation clogging powers and clay weighting effects. While the base of a drilling fluid consists of a simple mixture of a weighting material such as barytes and a suspending agent such as bentonite, this basic mixture has to be modified with various chemicals, depending upon the particular kind of earth formation and the kind of water which permeates the earth formation. The properties of the weighting material or the bentonite or the added clay may be deleteriously affected during drilling and no two oil well drilling conditions are identical because of variation in earth formation constituents as well as in oil well depth.

Because of these variable oil well drilling conditions, numerous oil well additives have been developed for the purpose of minimizing or eliminating certain ill effects such as clay flocculation, excessive bentonite viscosity, and poor mud filter cake impermeability. Separate additive chemicals have to be used for separate ill effects. Thus, alkali phosphates may be added to modify viscosity, starch to obtain enhanced mud filter cake impermeability and barium carbonate to remove sulphate and calcium or magnesium ions.

The water inert but activatable colloid of this invention is capable of combining in a single product the ability to carry out drilling mud modifying functions which ordinarily require two or more separate additives. Thus, as will be later demonstrated, this colloid is capable of simultaneously beneficially affecting the viscosity, suspending power, mud cake permeability and sulphate as well as Ca or Mg ion removal of a drilling fluid.

One of the objects of this invention is to provide a well-drilling-fluid modifying material which, upon proper activation, acts simultaneously as a cold water swelling carbohydrate colloid, a mud weighting material, an ion removing material and a mineral suspending and dispersing material.

Another object is to provide a metal-carbohydrate colloid complex which, upon proper activation, acts simultaneously as a clay bonding agent, an improver of mud filter cake impermeability, a modifier of bentonite viscosity, and a remover of deleterious clay flocculating ions.

Another object is to provide a metal-amylopectin complex which, upon proper activation, enables the functioning of the combined deflocculating influences of the amylopectin and metal portion of the colloid complex, as well as the ability of the metal portion to create pore-plugging precipitates; thereby enhancing the sealing and compacting effects of weighting material such as barytes when used to block porous earth formations encountered in oil well drilling.

Further objects will appear from the detailed descriptions in this invention in which several examples are submitted. It shall be clearly understood, however, that various changes, modifications, and alternative procedures are contemplated without digressing from the spirit or scope of this invention.

It has been discovered that certain metal complexes of water-swellable or gel-forming carbohydrate polymers are capable of causing combined beneficial effects on drilling mud qualities. It has been found that such metal carbohydrate complexes can bring about drilling mud quality effects which ordinarily require two or more separate reagents to attain similar results. These metal complexes of carbohydrate colloids, when properly prepared and properly applied to the drilling method, enable drilling mud technique manipulation which hitherto was not possible.

A preferred metal-carbohydrate complex for use in drilling muds, is the barium metal amylopectin complex obtained from corn starch. The general procedure for preparing such metal-starch-fraction complexes is described by Ernst Stern on page 88 of volume 41 of the Zeitschrift für Angew. Chemie. The exact chemical nature of these metal derivatives of starch is not known. Some carbohydrate chemists consider these products to be definite chemical entities of the metal with the starch molecule, others claim it is the metal oxide which is attached to the carbohydrate, others claim it is the metal hydroxide which is chemically attached, while still others claim that the metal oxide or hydroxide is present in a loosely associated form and is not rigidly fixed to the carbohydrate molecule. For the purpose of this invention, the products preferred for use in drilling fluids shall be hereafter designated as "metal-amylopectin complexes". The term "amylopectin" in modern starch technology refers to that portion of the polysaccharides in starch which is known as the branched polymer fraction. The linear polymer fraction of starch is known as the amylose fraction of starch.

Most starches comprise both amylopectin and amylose, with amylopectin or branched chain polymer fraction being the predominating amount. Examples are corn, wheat or potato starch. A few starches consist wholly of amylopectin or branched chain polymer. Examples are waxy maize starch and waxy sorghum starch. These waxy starches are not readily commercially available and their cost is much more than ordinary corn or sorghum starch.

It has been found that Ba-starch prepared from ordinary starch is much higher in amylopectin content than the original starch used for the barium derivation. This discovery enables the production of Ba-amylopectin complexes without resorting to expensive waxy starches.

EXAMPLE I

Production of Ba-amylopectin complex

Mix 100 parts by weight of refined, non-modified corn starch with 210 parts of cold water until a smooth, lump-free starch milk is obtained. Add slowly, in small increments, and with constant stirring of the starch batch, a cold solution of 7 parts of caustic soda dissolved in 15 to 18 parts of water. The alkali will cause the starch suspension to be transformed into a viscous gelatinous paste and it is necessary to use mixing equipment capable of maintaining agitation during the pasting stage. The addition of the caustic should take about an hour and during this time the increments of caustic soda solution added should not be so large as to cause the formation of localized plaste lumps in the batch.

After all the caustic has been added and the agitation has broken up any lumps and produced a smooth, glossy, stiff starch paste, add 75 parts of cold water and agitate for 30 minutes. Add slowly, with continuous stirring, a cold barium chloride solution consisting of 35 parts of crystalline barium chloride dissolved in 140 parts of water. The addition of all of the barium solution should take about 30 minutes. The barium chloride reacts with the caustic starch paste consisting of a sodium-starch complex, whereupon the paste gel is completely destroyed and there results a heavy, granular, white precipitate of a Ba-amylopectin complex concentrate which settles very rapidly and which can be easily purified by either decantation or by filtration. The remaining liquid medium consists of the sodium chloride produced from the barium chloride reaction, of excess barium chloride and of soluble Ba-amylose complexes.

Allow the Ba-amylopectin-complex concentrate to settle for 30 minutes and decant the top liquor. Add fresh cold water, agitate for 5 minutes, settle for 15 minutes, decant, and repeat once again a fresh water addition and a decantation, allowing the Ba-amylopectin complex to settle thoroughly for 30 minutes. Dry the settled Ba-amylopectin between the heated rolls of a double drum roll drier or by means of spray drying and produce a dried Ba-amylopectin product of about 70 mesh.

By the above means, a Ba-amylopectin product is obtained which contains less than 1% of chlorides, preferably less than 0.5%. The product is a heavy, inert, water insoluble, non-gelling material analyzing about 10% of BaO when ashed directly.

In accordance with this invention, it has been found that the barium chloride exercises a selective starch precipitating effect whereby it brings about the precipitation, out of caustic solution, of a Ba-starch complex wherein the branched chain polymer fractions of the starch are present in considerably greater amounts than that existing in the originally treated intact starch. That is the reason why the preferred designation of such a product is Ba-amylopectin-complex "concentrate," i. e., greater amounts of branched chain polymer material are concentrated in this product than in the original starch. Actual analysis of the percent of branched chain polymer fraction prove this point. The original corn starch used in the above example for the preparation of Ba-amylopectin and the Ba-amylopectin were analyzed for the amount of branched chain polymer present by the iodine affinity method of Bates, French and Rundle (J. Am. Chem. Soc., pg. 142, 1943) with the following results:

| Product | Percent Branched Polymer |
|---|---|
| Corn starch | 73 |
| Ba-amylopectin-complex | 83 |

The above data shows a 10 point increase in branched polymer content or an increase of 13.7% over the original amount of amylopectin present. To the drilling fluid art, this is important because of the greater efficiency with which the branched chain polymer portion of starch influences clay and bentonite properties.

The inert, water insoluble Ba-amylopectin can be readily activated and transformed into a reactive aqueous medium wherein the amylopectin is liberated from the Ba and automatically becomes a cold water swelling starch fraction of high branched chain polymer content, and the freed Ba is changed to a finely dispersed, insoluble barium salt which is disposed in fine distribution within the formed amylopectin viscous gel medium. To accomplish activation, it is only necessary to have present in an aqueous suspension of the inert Ba-amylopectin an anion capable of forming a water-insoluble salt with the barium. Examples of such anions are phosphate, sulphate, carbonate, silicate, sulphite, stearate and tannate. Any cation which produces water soluble salts with the said anions may be used and the particular combination used will depend on the properties desired in the resulting colloidal medium of branched chain polymer and barium salt precipitate.

Thus, if optimum cold water swelling or gelling of the branched chain polymer portion is desired, then it is best to use alkali metal salt such as a phosphate or silicate of sodium, or such reagents as potassium sulphate, potassium stearate, sodium sulphate or sodium bicarbonate. In this way the amylopectin will form an alkali metal complex and the latter has superior cold water swelling or paste forming qualities than the alkali metal free branched chain polymer. If one desires enhanced mud weighting effects and there is no need for optimum amylopectin swelling, one may add iron sulfate whereupon there is obtained, in addition to the barium sulphate weighting effect, the mud weighting influence of iron hydroxide. Simultaneously there is released a branched chain polymer of lower swelling powers but of different colloidal properties than that obtained when using an alkali metal salt.

Because of the combined cold water swelling and cation exchange activity and because of the essentially inert nature of the Ba-amylopectin in the absence of activating anions, the Ba-amylopectin makes possible unique and novel modifying effects in the drilling-fluid art. The product's inertness without activation, makes it possible to add it at any desired point or phase in a drilled oil well and postpone the cold water gelatinization until such time as it is definitely needed. The inability of the product to swell even in hot water makes it possible to add it under high pressure and temperature conditions without premature gelatinization and without the problem of lost starch viscosity caused by prolonged heat exposure. The increased branched chain polymer content contributes towards improved effects on clay, weighting materials and bentonite. Branched-chain amylopectin is stable in aqueous solution whereas the straight chain amylose fraction of starch precipitates spontaneously from solution with resulting deleterious clay treating effects. The branched-chain material produces soft gels which redissolve, whereas amylose straight chain polymer solutions set quickly to irreversible gels. The amylopectin, for the same concentration, gives much higher viscosity than amylose solutions and exercises a greater protective colloid effect on clays than amylose. These are all factors of vital importance to the drilling fluid art. By the use of a corn starch Ba-amylopectin-complex concentrate one is able to better exploit the modifying powers of the branched-chain polymer fraction while at the same time decrease the amylose content by over one-third and thereby inhibit the ill effects of the straight chain polymer. Simultaneous with the branched-chain polymer advantages, the Ba-amylopectin complex offers the reactivity of the Ba metal cation which makes possible simultaneous mud weighting effects as well as further manipulation of such variables as suspending power, protective colloid action, bonding power and ion removal.

While, for general purposes, the Ba-amylopectin complex prepared from corn starch per Example 1 is satisfactory, the invention is not limited to the use of this particular product. A better but much more expensive product which one could use would be the wholly branched-chain Ba-amylopectin obtained from waxy maize starch. The nature of the Ba-amylopectin obtained can be very widely varied. By increasing the amount of caustic used in its preparation and using correspondingly larger amounts of barium chloride one may obtain products ranging in Ba content from about 8 to 14 percent. One may also apply the same reaction principles to obtain a metal-amylopectin complex containing, in addition to Ba, other metals such as Al or Mg or Zn. Such metal-amylopectin complexes will have modified drilling-mud treating properties and their use will depend upon whether these properties are particularly adapted to specific oil well drilling conditions. The starch end of the metal-amylopectin can also be widely varied, depending upon the particular end-product qualities desired. If, in place of non-modified starch, one uses thin boiling, or oxidized, or chlorinated, or roll heat gelatinized starches, different effects will be obtained, some of which may be particularly useful for the production of a specific type of Ba-amylopectin product to meet some specific oil well drilling condition.

The following examples will illustrate in a more specific manner the use of Ba-amylopectin in specific phases of the drilling-mud art.

EXAMPLE II

*Treating deficient drilling-fluid bentonite*

With some bentonites, such as, for example, certain California bentonites, it is difficult to obtain the conditions required in a good drilling fluid, i. e. good gel-forming powers and sufficiently high viscosity, both coupled with low water loss or filter-cake permeability. The incorporation of small amounts of Ba-amylopectin with such a bentonite will transform a defective product into one satisfactory for drilling fluid use. The amount of Ba-amylopectin used and the conditions under which it is applied, will depend to some extent on the nature of the water at the well which is used to suspend the bentonite.

Alkali-metal gel-forming bentonites are preferred in drilling fluids. Some of the California bentonites are alkali-metal deficient and Ba-amylopectin offers a means of bringing alkali-metal ions into contact with such deficient bentonites. The amount of alkali-metal cation which is needed to bring about bentonite improvement is very small and water containing as little as 0.0001% of alkali-metal ion will substantially improve a bentonite deficient in this respect. However, in order to obtain low filter-cake permeability it is necessary to avoid the highly caustic alkalies because, while they improve bentonite viscosity and gelling power, the filter-cake permeability is adversely affected. The addition of alkali-metal salts such as chlorides or sulfates offer a partial solution to the problem but have the disadvantage of introducing anions which are deleterious.

When Ba-amylopectin is blended with a deficient bentonite and suspended in well-processing water, the Ba as well as the amylopectin proceed to nullify the bentonite's deficiencies and produce a combination of low water loss with good gelling power and viscosity. The degree of Ba-amylopectin effect will depend upon the nature of the electrolytes present in the processing water. The chemical and activated colloidal nature of the Ba-amylopectin is such as to beneficially react with many of the constituents ordinarily present in water. Thus, if sulfates or carbonates or bicarbonates are present in the water, these will be effectively removed by the Ba in the amylopectin. Simultaneously, the alkali-metal cation, if present, will replace the Ba in the Ba-amylopectin and the resulting Na-amylopectin will swell in the cold water, become intimately colloidally interspersed with the bentonite and cause the latter to attain an enhanced alkali-metal ion content, with resultant improvements in the deficient bentonites viscosity and gelling-power without losses in filter-cake impermeability. Superimposed upon this, there will be the additional viscosity and gel effects of the branched-chain amylopectin polymer which also make possible still greater decreases in water loss and which enable the use of drilling muds with saline waters.

Where one desires only to improve the deficient bentonite's viscosity or gelling power, without losing filter-cake imperemability, one may blend with such a bentonite between 0.25 and 1.0% of Ba-amylopectin. If the processing water to be used with the bentonite, contains less than about 300 parts per million of mixtures of alkali or alkaline earth sulphates, carbonates, bicarbonates or sulphites, the blend of deficient bentonite with Ba-amylopectin may be used directly, and the Ba-amylopectin, in conjunction with the described water impurities, will produce a satisfactory functioning bentonite. If the water is devoid of such impurities then it is preferable to incorporate with the bentonite-Ba-amylopectin blend, an amount of such Ba cation-exchange alkali-metal materials as trisodium phosphate, sodium metasilicate or sodium bicarbonate which will be sufficient to react with the Ba in the Ba-amylopectin.

The preferred material to add to the Ba-amylopectin-bentonite blend is sodium bicarbonate. During the Ba-amylopectin activation, this results in the formation of barium carbonate. This, in turn, results in the beneficial removal of sulphate and calcium ions from the drilling fluid medium.

As a specific example: a deficient California bentonite was mixed with distilled water to a 5% suspension and the Stormer viscosity and water loss determined, the latter being measured in accordance with the method of the American Petroleum Institute. A sample of the same deficient bentonite was blended with 0.5% of Ba-amylopectin prepared as described in Example I and then further blended with 0.03% of sodium bicarbonate. A distilled water suspension of this blend was prepared, wherein the bentonite content was 5%. Upon comparing the viscosity and water loss data of these two aqueous bentonite suspensions, it was found that the Ba-amylopectin treated suspension had a viscosity of 25 centipoises greater than the non-treated bentonite, but that the water loss was 8 cc. less.

EXAMPLE III

*Treatment of drilling fluid clays*

100 parts of a Wyoming bentonite of a type in common use in oil well drilling muds was blended with 20 parts of Ba-amylopectin prepared per Example I and with 2 parts of trisodium phosphate. Upon suspension in a saturated salt solution, and subjecting the suspension to the standard A. P. I. water loss test, it was found that the water loss was 12 cc. less than that obtained when no Ba-amylopectin was used.

The other advantages of the presence of Ba-amylopectin in an actual commercial drilling fluid have already been submitted. Under commercial use it is preferable to first add the bentonite-Ba-amylopectin blend to the drilling fluid and allow the Ba-amylopectin to react with whatever Ba-reactive anions present in the processing water. Since various alkali phosphates are commonly added to drilling fluids, these materials, when added, will assure the further and complete reaction of the Ba in the amylopectin and the resulting drilling fluid advantages, such as increased weighting material, improved suspending power and lower water loss will ensue.

For maximum low water loss effects in saline waters, wherein water losses of less than 1 cc. may be obtained, it is preferable to use a Ba-amylopectin obtained from a thin-boiling corn starch having a fluidity of between 30 and 60.

EXAMPLE IV

*Improving the sealing action of weighting materials*

In the sealing of porous earth formations for the purpose of either preventing drilling fluid lost circulation or closing a well which is to be abandoned, suspensions of weighting materials such as barytes are frequently used. For such purposes it is necessary to use a dispersing agent capable of inhibiting the adherence of the finer barytes particles to the larger ones, in order that the fine particles be better able to close up the voids left by the large particles. It is also desirable to create conditions wherein, once the baryte particles are within the pores, that they be present in a compact, adherent form.

The addition of about 1% of Ba-amylopectin to a barytes weighting material, under proper activated conditions, contributes materially to improved sealing effects. One satisfactory procedure is to pretreat the formation to be compacted or sealed with a 0.1% sodium hexametaphosphate solution, in order that many flocculating substances present in the formation may be neutralized. Upon blending barytes with 1% by weight of Ba-amylopectin prepared as described in Example I and upon treating the formation with a 15% aqueous suspension of such a modified barytes, the pores in the formation are filled and packed efficiently by a colloidal mixture wherein the barytes particles are properly dispersed, wherein the created barium phosphate precipitate adds to the weighting effect as well as helps to fill the voids left by some of the larger barytes particles and wherein the branched-chain amylopectin polymer acts first in the dilute aqueous phase as a barytes dispersant and in the formation-pore deposited stage as a bonding agent to seal the inorganic weighting materials. These dispersing and bonding effects are much more efficient with branched-chain polymer starch fractions than with whole starch. The sealing effects obtained in this manner are more effective and efficient than that obtained by the use of sodium phosphate alone.

Still better weighting material dispersing effects may be obtained by using a Ba-amylopectin complex obtained from oxidized starches such as sodium hypochlorite or peroxide modified starches.

The filling of large pores in earth formations can be improved by pretreating the formation with a dilute soap solution such as tall oil soap. Upon bringing the treated formation in contact with an aqueous suspension of a blend of barytes with Ba-amylopectin, the Ba tall oil soap which is formed during the activation of the Ba-amylopectin, forms a gelatinous precipitate which is more amenable to the filling of larger sized formation pores.

Constructive suspending, pore-packing and bonding improvements are also obtained when Ba-amylopectin is added to other plugging materials used in lost circulation problems, such as, for example, ground mica or ground sugarcane bagasse.

The above examples illustrate the principles of this invention. Numerous modifications are possible without deviating from the scope of the invention. While the preferred drilling fluid modifying material is a Ba-amylopectin, constructive drilling fluid improvements may be obtained by similar products wherein either the Ba or the carbohydrate polymer is different. In place of Ba one may use any metal or combination of metals which produces a water insoluble but anion-activatable metal-carbohydrate complex. In place of starch, one may use any amylaceous material such as potato flour, degerminated corn metal or milo sorghum meal. Other equivalents will be apparent to those skilled in the art.

I claim:

1. An aqueous well-drilling-fluid containing a small percentage of an insoluble, anion activatable, amylopectin complex of a metal of a group consisting of barium, aluminum and zinc in an amount sufficient to attain a low water-loss.

2. An aqueous well-drilling-fluid containing a sufficient percentage of a Ba-amylopectin complex to attain a low water-loss.

3. An aqueous well-drilling-fluid containing sufficient of a Ba-amylopectin complex admixed with a water-soluble salt possessing anions adapted to precipitate a barium salt and simultaneously liberate a cold water swelling amylopectin in order to attain a low water-loss.

4. The process of treating aqueous well-drilling-fluids, comprising, pumping the drilling fluid into the bore-hole and back to the surface causing a solid component of the fluid to be deposited in the bore-hole wall, and adding thereto during the course of drilling and in amount sufficient to maintain a low water-loss a Ba-amylopectin complex.

5. The process of treating aqueous well-drilling-fluids, comprising, pumping the drilling fluid into the bore-hole and back to the surface causing a solid component of the fluid to be deposited in the bore-hole wall, and adding thereto during the course of drilling and in amount sufficient to maintain a low water-loss a Ba-amylopectin complex and an amount of sodium bicarbonate sufficient only to react with the Ba of the Ba-amylopectin.

6. The process of simultaneously removing deleterious sulphate and calcium ions, and improving weighting material suspension power in well-drilling-fluids, which comprises, pumping the drilling fluid into the bore-hole and back to the surface causing a solid component of the fluid to be deposited in the bore-hole wall, and adding thereto during the course of drilling and in amount sufficient to maintain a low-water-loss a Ba-amylopectin and an amount of sodium bicarbonate sufficient only to react with the Ba.

HAROLD E. BODE.

References Cited in the file of this patent

UNITED STATES PATENTS

| Number | Name | Date |
|---|---|---|
| 2,200,710 | Bent et al. | May 14, 1940 |
| 2,270,006 | Kennedy | Jan. 13, 1942 |
| 2,417,307 | Larsen | Mar. 11, 1947 |
| 2,481,545 | Wagner et al. | Sept. 13, 1949 |
| 2,554,214 | Scarth | May 22, 1951 |
| 2,557,473 | Ryan | June 19, 1951 |